June 13, 1967     H. G. JOHNSON     3,324,895
CORRUGATED TUBES

Filed Oct. 6, 1964     2 Sheets-Sheet 2

INVENTOR
Herbert G. Johnson

United States Patent Office 3,324,895
Patented June 13, 1967

3,324,895
CORRUGATED TUBES
Herbert G. Johnson, 17 N. Drexel Ave.,
Havertown, Pa. 19083
Filed Oct. 6, 1964, Ser. No. 401,959
12 Claims. (Cl. 138—121)

ABSTRACT OF THE DISCLOSURE

The present application discloses a laminated corrugated continuous imperforate tube having a lining formed of one or more layers of memory-sensitive corrosion-resistant plastic material which is pressure-form-stabilized in situ in an outer jacket, the jacket preferably being a strong corrosion-resistant metal such as stainless steel and the inner lining preferably being a presintered polymerized fluorocarbon and most preferably being polytetrafluoroethylene (PTFE).

Related application

This application is a continuation-in-part of my copending application Ser. No. 67,563, filed Nov. 7, 1960, now Patent No. 3,191,041, July 13, 1965.

Summary of invention

This invention relates to corrugated tubes, especially to laminated toroidal corrugated tubes, and more especially to such tubes which are formed by the method and apparatus of the above-noted copending application; and has for an object the provision of improvements in this art.

The term "toroidal" is used herein in its ordinary sense, as in referring to automobile tires and the like wherein the outer portion is generally circular in annular cross-section, this circular annular section herein having a circular arc of considerably more than 180 degrees and being joined to the cylindrical body of the tube by a restricted inner portion which is axially much shorter than the diameter of the annular outer section, the space between adjacent corrugations along the tube being at least as much axially as the diameter of the annular outer section so that the outer annular portions of the corrugations are spaced apart axially.

One of the particular objects of the invention is to form a tube with toroidal corrugations of regular and desired shape in which the corrugations are of substantially uniform wall thickness and diameter and not flattened on the periphery as is so usual with toroidal corrugations made by prior methods, especially when made of plastic materials.

Another object is to provide a toroidal corrugated tube in such manner that the desired uniform wall thickness and radius are obtained and retained.

Another object is to stabilize the shape of the corrugations when formed of a material having memory, that is, having a tendency to return by creep to a prior shape.

Another object is to form a reinforced corrugated tube which has great flexibility and strength, free from incipient points of weakness.

Another object is to make laminated corrugated tubes, either of metallic or non-metallic materials or both.

Drawings

The above and other objects and advantages of the invention will be apparent from the following description of an exemplary embodiment, reference being made to the accompanying drawings, wherein.

Specific description

Figure 2:
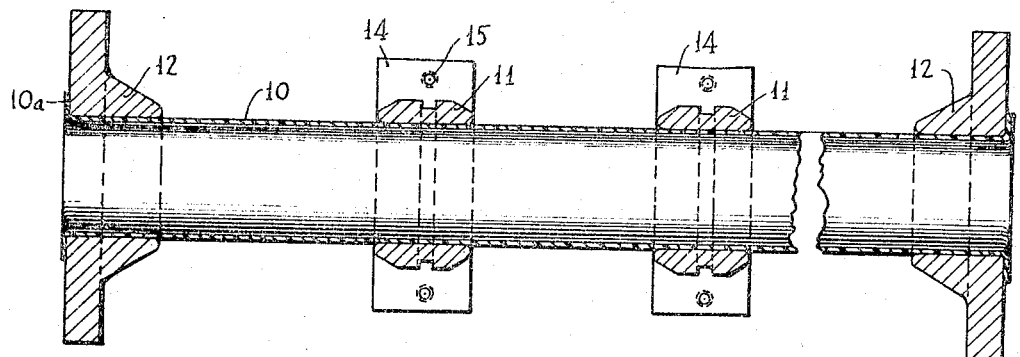
FIG. 2 is a section through a tube with spaced reinforcing rings thereon in preparation for forming corrugations.

In FIG. 2 there is shown a tube 10 having a plurality of intermediate reinforcing rings 11 placed thereon at spaced points along its length (usually evenly spaced) and end reinforcing rings or bands 12 which are to form permanent attachment fittings, the tube having end flanges 10a formed thereon after all the reinforcing rings have been placed on the tube. This end flanging is known as vanstoning. With other forms of end fittings and apparatus, the tube ends may not have flanges formed on them at all, or not until later. Sealing rings may be used on the tubes.

In FIG. 2 there are also shown split ring die members or spacer elements 14 which have semi-circular sockets to embrace the intermediate reinforcing rings 11 to keep them in proper position, well-known means being provided for keeping the members and rings evenly spaced as the corrugations are formed.

Figure 3:
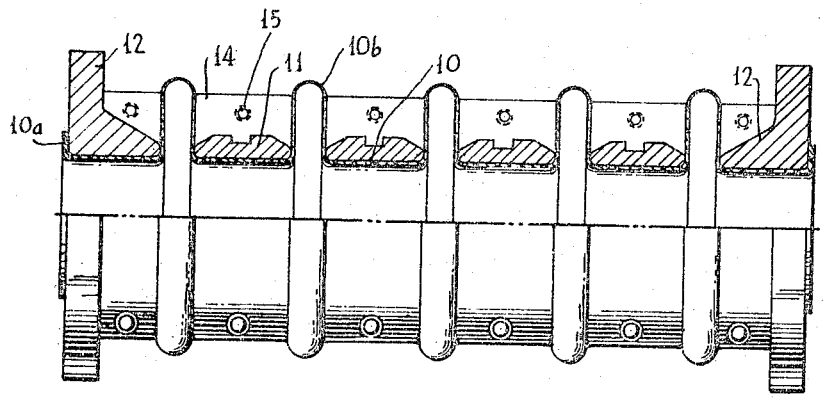
FIG. 3 shows the corrugations after the first stage of formation.

In FIGS. 2 and 3 the split ring die members 14 are shown as being clamped on place, as by quick-operating bolts 15, so as to be removable after the first stage of the corrugation-forming operation has been completed. The members 14 are representative of spacers which cause the tube 10 to first have formed thereon flat-sided corrugations 10b with rounded peripheries.

Figure 4:
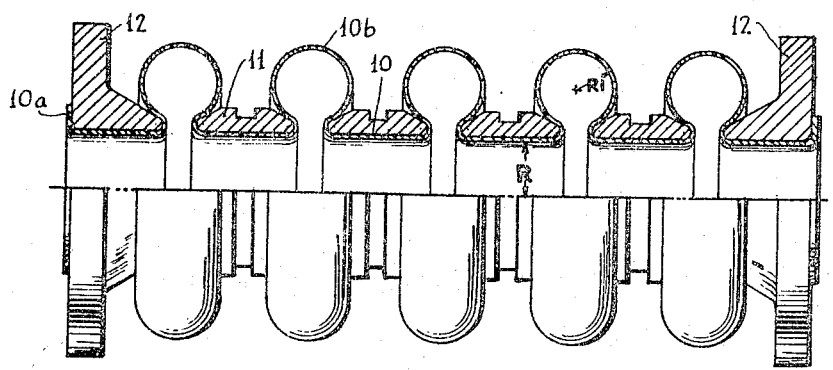
FIG. 4 shows the completed corrugations.

Subsequently, as shown in FIG. 4, the spacers 14 are removed and by continued pressure thereafter the corrugations are expanded on the sides to form the toroidal shape 10b1. The arcuate peripheral portions have been work hardened and largely keep their shape. The reinforcing rings are left on the tube between corrugations to confine and support the straight portions in use.

Figure 5:
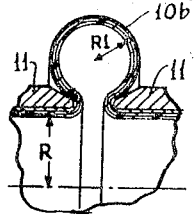
FIG. 5 shows a corrugation formed of a plurality of layers.

FIG. 5 shows part of a single corrugation 10b' which is formed of laminae which are in intimate contact at their faying or contacting surfaces. Such a laminated form is very useful in certain plastics to assure that there are no through-running pin holes to cause leakage. The laminated wall can be dealt with like a single thickness wall because the laminae are in tight intimate contact. If desired, the lawers may be adhesively or otherwise bonded together. Plastic lined corrugated metal tubes can be formed in this manner. An outside metal layer or jacket is shown in FIG. 5. It is understood that the plastic tube may be formed alone; or that one or two layers of plastic may be disposed as liners within a metal tube. Metal tubes alone can be formed by this process and apparatus.

In making laminated tubes of a plastic having a memory or creep, such as polymerized fluorocarbons known as "Teflon," "Kel-F," and the like, one tube is stretched hot, as on a mandrel, to expand it to such size that it will just fit over another tube and shrink thereon when cool. It is not cooled in its expanded state to take a set unless it is to be put on later, in which case it would be reheated sufficiently to restore its memory. The laminae fit very tightly without any air between them but are not bonded together unless this is specifically desired because the layers need to have some relative slip while corrugations are being formed. The use of sintered material rather than unsintered material avoids sticking together of the layers of plastic.

Very unusual advantages are obtained by using metal tubes with plastic liners. Metals, such as stainless steel have been used to obtain great strength and corrosion resistance; while the plastic liner protects from injurious substances inside the tube. When a plastic liner, which usually has memory if not formed hot and chilled, is used inside a metal outer tube the liner is formed in situ entirely under compression against the metal by the very high pressure of the fluid needed to form the metal. When compression-formed in this way, i.e., is pressure-form-stabilized, the plastic loses its memory characteristics, even at normal room temperature, like it otherwise would with heating, distortion, cooling, and heat stabilizing.

The provision of a metal jacket also provides for brazing or welding the jacket to the reinforcing rings to hold them in position during the forming operation, the plastic liner tube usually being inserted after the rings have been secured to the metal jacket. Fittings can also be attached to the metal jacket.

Figure 1:
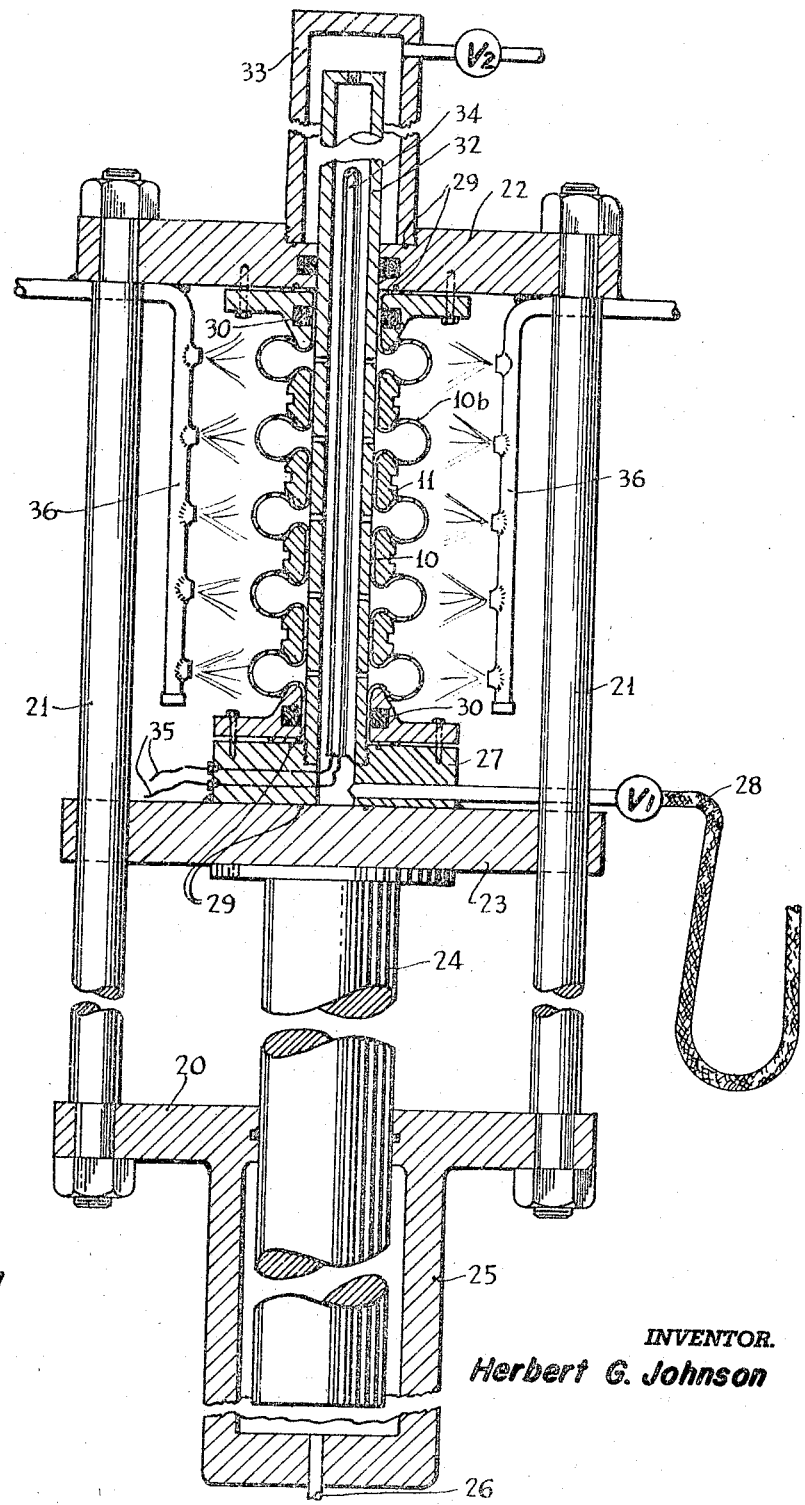
FIG. 1 is an elevation, partly in section and partly diagrammatic, of apparatus for forming a plurality of corrugations simultaneously on a tube.

FIG. 1 shows exemplary apparatus for forming the corrugated tubes. Here a fixed base 20 carries columns 21 which are connected at the top by a fixed head 22. A slidable crosshead 23 moves along the columns under the action of a power ram 24 operating in a fluid pressure cylinder 25. A pipe 26 provides flow of controlled pressure fluid in and out of the cylinder as required for operation of the ram.

A cored plate 27 with a fluid connection hose 28 provides, with a valve V1, a controlled flow of pressure fluid into and out of the tube being corrugated. Seals 29 are provided for the end flanges of the tube when clamped down. O-rings 30 can be provided for the periphery of a straight tube (without end flanges) when it is not desired to have the end flanges on the tube at this stage.

For some purposes it is desirable to have a mandrel 32 located within the tube during formation, the tube here being shown as secured to the cored plate member 27 so as to have fluid enter it. The fluid flows out of spaced holes in the mandrel. A long cap 33, here shown broken for foreshortening in illustration, provides the necessary long movement of the perforated mandrel while preventing leakage.

For some materials it is necessary to heat the mandrel and thereby, together with the hot fluid, to heat the tube interiorly during formation and for this purpose a core heater 34 is shown, this having leads 35 and controls for supplying current at the time and in the amount needed. Memory plastics are known to retain their shape if heated above their expected service temperature and then suddenly quenched.

Some materials, such as certain plastics, have "memory," as mentioned before, and need to be cooled quickly after being shaped to desired form, usually hot as by the heating means described or by heated pressure fluid or the like, and for this quenching operation cooling means, here represented by the spray pipes 36, are provided. A valve V2 in an outlet pipe from the cap 33 regulates the outflow under control when the mandrel is pushed up or when heated fluid is circulated.

Figure 6:
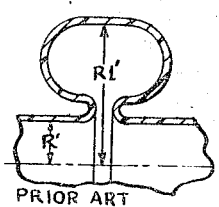
FIG. 6 shows a portion in section of a malformed corrugation as made by prior methods.

It is a feature of this invention that toroidal corrugations are formed without flat outer portions. Such flat portions will get out of shape in use under pressure and do not allow the desired free and even expansion and bending of the bellows tube. Such flat portions, by normal methods of formation, are usually located on the outer periphery of the corrugations. The present method, by confining the corrugations against axial bulging, until the desired radial expansion has been attained, causes the formation, after the axial constraint has been removed, of corrugations which in toroidal section are almost circular for over 180 degrees of arc. Also (FIG. 4) the toroidal section radius R1 is less than the initial tube radius R. This is not true of corrugations formed by previous methods (FIG. 6) where the radius R1′ of part of the toroidal section is much greater than the radius R′ of the tube itself.

Means, other than the rings 11, could be used for restraining the body of the tube during that part of the operation in which flat-sided corrugations are being formed. Indeed, there is known prior art apparatus for forming flat-sided corrugations; but they do not do any further forming action. According to the advance made by the present invention, it would then be necessary to apply and secure together split rings 11 and then finish the forming of the toroidal corrugations as before. By such an arrangement it would be possible to use step-by-step corrugating apparatus along the lines of that disclosed in my copending application Ser. No. 612,818, filed Sept. 28, 1956, now Patent No. 3,105,539, granted Oct. 1, 1963.

Furthermore, if desired, tubes can be made without the reinforcing rings being left thereon by the same provision of split rings (comparable in application and removal to the present split die ring members 14) as just mentioned. Circumferential splitting is also readily provided if the toroidal overhang should give any difficulty in removal. Thin walled tubes, of course, have great yield to assist removal of rings; but heavier walled tubes and stiffer material require special provisions.

The operations of forming corrugated tubes according to the present invention should be clear from the preceding description.

The corrugated tubes provided by the present invention have improved structure and shape which are readily visible; and also have improved structure and characteristics which result from the method of formation and which can be detected by analytical examination and service performance. Particularly when a memory plastic liner as of a fluorocarbon polymer, is explanded within a resistant outer jacket or sheath of retentive material, the liner takes a set and loses its memory characteristic. This is especially true when the inner liner is heated during formation and then chilled. A metal outer jacket is inherently more resistant to expansion than the plastic inner liner and will provide the necessary resistance to cause the inner liner to take a set, i.e., lose its memory characteristic, and become stabilized so that it remains tight within the jacket in subsequent service.

A similar effect is produced when the jacket is another tube of plastic material. It resists the expansion of the inner plastic tube and tends to cause it to take a set or to stabilize. The effect is accentuated by heating the assembly interiorly, as provided hereby, to cause the outer tube to offer greater resistance to expansion than the inner tube. Chilling after formation aids in retaining the shape and stabilizing the structure against later memory deformation.

The use of pre-sintered plastic tubing, especially with plural plastic laminae aids in forming satisfactory structures by minimizing the sticking together of laminae and allowing local slip during formation.

The finished laminated corrugated tube exhibits distinguishing characteristics of having the inner lining formed in situ under pressure-form-stabilization within the outer jacket. First, the fact that it is present in close intimate contact throughout its extended surface in the corrugations, especially bulbous or toric corrugations, is an indication that it must have been formed in this manner. Next, the fact that there will be no gas inclusions or areas of non-contact between jacket and lining. By any other known process it would be impossible to avoid gas inclusions and areas of non-contact, especially in the corrugations and more especially with the toroidal corrugations of over 180 degree circular portion. Further, the wall thickness of the packet and lining will have the same ratio of final thickness relative to original thickness throughout all portions of the length and circumference of the finished tube. By the present method of corrugating, by end pressure shortening and simultaneous internal pressure bulging of the tubes, the original wall thickness of jacket and lining are maintained practically unchanged from the original wall thickness except in the outer portions of the toroidal corrugations and here any slight thinning of the jacket and lining will be uniform.

When desirable, as for vacuum service, the lining may be bonded by known methods to the jacket prior to corrugating. Even the most anti-stick surfaces, such as fluorocarbons and olefines, may be made to adhere with sufficient strength, when pressure-formed with continuous intimate contact according to the present invention, to resist collapsing of the liner under the highest vacuum at maximum service temperatures.

This could not be the case if a lining tube were expanded into the corrugations of a pre-formed corrugated tube jacket by any other known method. The use of pre-sintered lining material can also be identified in the final product by smoothness of surface finish, close dimensional tolerance, freedom from cracks, blisters or wrinkles and uniformity from piece to piece.

While certain embodiments of the invention have been described for purposes of illustration, it is to be understood that there may be various embodiments and modifications within the general scope of the invention as defined in the claims hereof.

I claim:

1. A corrugated tube, comprising in combination, an outer continuous imperforate jacket cylindrical and corrugated portions, and an inner continuous imperforate lining of stabilized memory-type plastic material in intimate contact engagement with the outer jacket throughout its entire extent over the cylindrical and corrugated portions.

2. A corrugated tube as set forth in claim 1, further characterized by the fact that the corrugated portions in toroidal section have a circular peripheral portion extending over more than 180 degrees and that the inner lining is pre-sintered plastic material which is pressure-form-stabilized in situ within the jacket.

3. A corrugated tube as set forth in claim 2, which further includes a band surrounding the cylindrical portion of the jacket between axially spaced toroidal corrugated portions.

4. A corrugated tube as set forth in claim 3, in which said outer jacket and band are are of metal.

5. A corrugated tube as set forth in claim 2, in which said jacket is provided with a flange at at least one end for attachment to adjacent elements, the inner lining extending around the inner surface of the flange to cover its surface within the tube space.

6. A corrugated tube as set forth in claim 1, further characterized by the fact that said outer jacket is formed of metal which is pressure-formed with the plastic lining in situ within it.

7. A corrugated tube as set forth in claim 6, in which said outer jacket is formed of thin stainless steel, and said inner liner is formed of pre-sintered polymerized fluorocarbon.

8. A corrugated tube as set forth in claim 6, in which said inner liner comprises a plurality of laminae of unbonded sintered polymerized fluorocarbon material in intimate surface contact.

9. A corrugated tube as set forth in claim 8, in which said liner is formed of polytetrafluoroethylene.

10. A corrugated tube as set forth in claim 1, further characterized by the fact that said outer jacket is formed of memory-type pre-sintered plastic material which is pressure-form-stabilized in situ without interface bonding with the inner plastic lining within it.

11. A corrugated tube as set forth in claim 1, further characterized by the fact that the inner lining is intimately adhered to the surface of the outer jacket.

12. A corrugated tube as set forth in claim 1, in which said jacket is provided with an outer form-fitting memory-type plastic cover.

References Cited

UNITED STATES PATENTS

| | | | |
|---|---|---|---|
| 2,699,959 | 1/1955 | Zallea | 138—121 |
| 2,728,356 | 12/1955 | Brinsmade et al. | |
| 3,023,787 | 3/1962 | Phillips et al. | 138—121 |
| 3,050,786 | 8/1962 | St. John et al. | |

LAVERNE D. GEIGER, *Primary Examiner.*

C. L. HOUCK, *Assistant Examiner.*